United States Patent
Sievert et al.

(10) Patent No.: US 12,028,790 B1
(45) Date of Patent: Jul. 2, 2024

(54) SYSTEMS AND METHODS FOR IDENTIFYING MEDIA ITEMS FOR SHARING

(71) Applicant: GoPro, Inc., San Mateo, CA (US)

(72) Inventors: Otto Sievert, Oceanside, CA (US); Scott Novell, Carlsbad, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/172,925

(22) Filed: Feb. 22, 2023

(51) Int. Cl.
*H04W 4/80* (2018.01)
*G06F 16/78* (2019.01)
*G06F 16/783* (2019.01)

(52) U.S. Cl.
CPC ............ *H04W 4/80* (2018.02); *G06F 16/783* (2019.01); *G06F 16/7867* (2019.01)

(58) Field of Classification Search
CPC ........ H04L 67/06; H04W 4/80; G06F 16/783; G06F 16/7867
See application file for complete search history.

(56) References Cited

U.S. PATENT DOCUMENTS

| | | | | |
|---|---|---|---|---|
| 2018/0218220 A1* | 8/2018 | Jung | ................. | G06F 3/005 |
| 2019/0037018 A1* | 1/2019 | Scurrell | ................. | H04L 67/10 |

* cited by examiner

*Primary Examiner* — Azizul Choudhury
(74) *Attorney, Agent, or Firm* — ESPLIN & ASSOCIATES, PC

(57) ABSTRACT

An image capture device may capture media items (e.g., images, videos, sound clips). An identifier of a mobile device of a user transmitted to the image capture device when the mobile device is in proximity of the image capture device may be used to identify media items that may include and/or be of interest to the user of the mobile device. An identifier and time of the image capture device transmitted to a mobile device of a user when the image capture device is in proximity of the mobile device may be used to identify media items that may include and/or be of interest to the user of the mobile device.

12 Claims, 6 Drawing Sheets

SYSTEMS AND METHODS FOR IDENTIFYING MEDIA ITEMS FOR SHARING

FIELD

This disclosure relates to identifying media items captured by an image capture device for sharing based on transmission and reception of an identifier of a computing device during media item capture by the image capture device.

BACKGROUND

Media items (e.g., images, videos, audio clips) captured by an image capture device may include people who do not own or did not use the image capture device. Identifying media items that include other people for sharing may be difficult and time consuming.

SUMMARY

This disclosure relates to identifying media items for sharing. An identifier and a time of a first computing device may be transmitted to a second computing device. The first computing device and/or the second computing device may include an image capture device. Transmission and reception of the identifier and the time of the first computing device may occur during media item capture by the image capture device. A media item captured by the image capture device during the media item capture may be identified for sharing based on the identifier and the time of the first computing device, and/or other information. The media item may be provided to a user of the first computing device or the second computing device.

A system for identifying media items for sharing may include one or more electronic storage, processor, and/or other components. The electronic storage may store information relating a computing device, information relating to a time of a computing device, information relating to an identifier of a computing device, information relating to transmission and/or reception of an identifier and a time of a computing device, information relating to an image capture device, information relating to a media item captured by an image capture device, information relating to provision of a media item, information relating to a user, and/or other information.

The processor(s) may be configured by machine-readable instructions. Executing the machine-readable instructions may cause the processor(s) to facilitate identifying media items for sharing. The machine-readable instructions may include one or more computer program components. The computer program components may include one or more of a capture component, a transmission component, a reception component, an identification component, a provision component, and/or other computer program components.

The capture component may be configured to capture one or more media items. The media item(s) may be captured by an image capture device during media item capture. A computing device may include an image capture device. For example, a first computing device, a second computing device, and/or other computing devices may include an image capture device.

The transmission component may be configured to transmit, via a transmitter, an identifier of a computing device, a time of the computing device, and/or other information relating to the computing device. The transmission component may be configured to transmit the identifier of the computing device, the time of the computing device, and/or other information relating to the computing device to one or more other computing devices. Transmission of the identifier of the computing device, the time of the computing device, and/or other information relating to the computing device may occur during media item capture by an image capture device.

In some implementations, a computing device may include a mobile device carried by a user. The mobile device may include a smartphone, a smartwatch, a smart tracker/tag, a tablet, another image capture device, and/or other mobile device.

In some implementations, the identifier of the computing device, the time of the computing device, and/or other information relating to the computing device may be transmitted using Bluetooth. In some implementations, the transmission of the identifier and the time of the computing device may include broadcast of the identifier of the computing device, the time of the computing device, and/or other information relating to the computing device.

The reception component may be configured to receive, via a receiver, the identifier of the computing device, the time of the computing device, and/or other information relating to the computing device. Reception of the identifier of the computing device, the time of the computing device, and/or other information relating to the computing device may occur during media item capture by an image capture device.

In some implementations, the reception component may receive the identifier of the computing device, the time of the computing device, and/or other information relating to the computing device based on the other computing device being within a range of broadcast of the identifier of the computing device, the time of the computing device, and/or other information relating to the computing device.

The identification component may be configured to identify one or more media items captured by an image capture device during media item capture. The media item(s) captured by the image capture device during media item capture may be identified for sharing. The media item(s) captured by the image capture device during media item capture may be identified based on the identifier of the computing device, the time of the computing device, and/or other information.

In some implementations, the media item capture by the image capture device may include capture of a video, and the media item(s) identified for sharing may include one or more segments of the video. In some implementations, the media item capture by the image capture device may include capture of a set of images, and the media item(s) identified for sharing may include a subset of images.

The provision component may be configured to provide the media item(s) to one or more users. The provision component may be configured to provide the media item(s) to a user of the computing device that transmitted its identifier and time, a user of the computing device that received identifier and time of another computing device, and/or other users.

In some implementations, the identifier and the time of a computing device that includes the image capture device may be transmitted to a mobile device carried by a user. The identifier and the time of the image capture device may be stored by the mobile device separately from the media item(s) captured by the image capture device. The media item(s) may be identified for sharing based on the identifier and the time of the image capture device stored by the mobile device separately from the media item(s). The media item(s) may be provided to the user of the mobile device.

In some implementations, the identifier and the time of a mobile device carried by a user may be transmitted to a computing device that includes the image capture device. The identifier and the time of the mobile device may be stored by the image capture device as metadata of the media item(s). The media item(s) may be identified for sharing based on the identifier and the time of the mobile device stored by the image capture device as the metadata of the media item(s). The media item(s) may be provided to the user of the mobile device. In some implementations, a capture time of a media item may be modified to match the time of the mobile device stored by the image capture device as the metadata of the media item.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
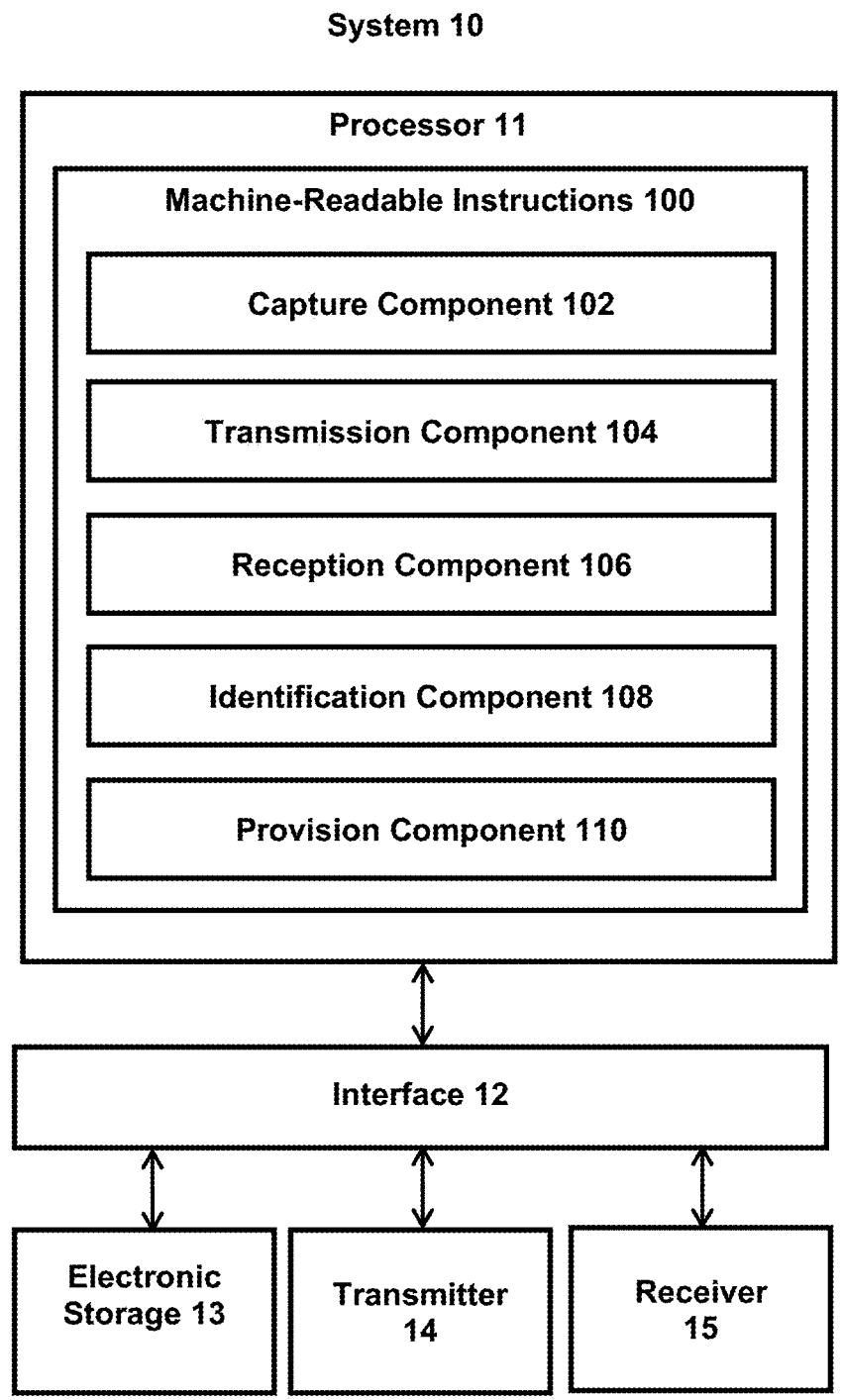
FIG. 1 illustrates a system for identifying media items for sharing.

FIG. 1 illustrates system 10 for identifying media items for sharing. The system 10 may include or be part of an image capture device. The system 10 may be remote from an image capture device. System 10 may include one or more of a processor 11, an interface 12 (e.g., bus, wireless interface), an electronic storage 13, a transmitter 14, a receiver 15, and/or other components. An identifier and a time of a first computing device may be transmitted by the processor 11 to a second computing device. The first computing device and/or the second computing device may include an image capture device. Transmission and reception of the identifier and the time of the first computing device may occur during media item capture by the image capture device. A media item captured by the image capture device during the media item capture may be identified for sharing based on the identifier and the time of the first computing device, and/or other information. The media item may be provided to a user of the first computing device or the second computing device.

The electronic storage 13 may include electronic storage medium that electronically stores information. The electronic storage 13 may store software algorithms, information determined by processor 11, information received remotely, and/or other information that enables system 10 to function properly. For example, the electronic storage 13 may store information relating a computing device, information relating to a time of a computing device, information relating to an identifier of a computing device, information relating to transmission and/or reception of an identifier and a time of a computing device, information relating to an image capture device, information relating to a media item captured by an image capture device, information relating to provision of a media item, information relating to a user, and/or other information.

The transmitter 14 may refer to equipment used to generate and/or transmit electromagnetic waves carrying information. The transmitter 14 may be part of or separate from a device including the receiver 15. The transmitter 14 may be configured to transmit information via the electromagnetic waves. The transmitter 14 may generate and/or transmit electromagnetic waves based on one or more wireless communication technologies, such as WiFi and/or Bluetooth.

The transmitter 14 may be configured to transmit information from one computing device to another computing device. For example, the transmitter 14 may be carried by an image capture device and may be configured to transmit information of the image capture device (e.g., information relating to identifier and/or time of the image capture device) to a mobile device. As another example, the transmitter 14 may be carried by a mobile device and may be configured to transmit information of the mobile device (e.g., information relating to identifier and/or time of the mobile device) to an image capture device. Use of the transmitter 14 to transmit information between other computing devices is contemplated.

The receiver 15 may refer to equipment used to receive and/or convert electromagnetic waves carrying information. The receiver 15 may be part of or separate from a device including the transmitter 14. The receiver 15 may be configured to receive information via the electromagnetic waves. The receiver 15 may receive and/or convert electromagnetic waves based on one or more wireless communication technologies, such as WiFi and/or Bluetooth.

The receiver 15 may be configured to receive information for one computing device from another computing device. For example, the receiver 15 may be carried by a mobile device and may be configured to receive information from an image capture device (e.g., information relating to identifier and/or time of the image capture device). As another example, the receiver 15 may be carried by an image capture device and may be configured to receive information from a mobile device (e.g., information relating to identifier and/or time of the mobile device). Use of the receiver 15 to receive information from other computing devices is contemplated.

Media items may be captured by one or more image capture devices. Media items may refer to items that may be visually and/or audibly consumed. Media items may refer to multimedia items. For example, media items may include images, videos, sound clips, and/or other media items. An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). An image capture device may capture other content, such as audio content (sound).

The system 10 may be remote from an image capture device or local to the image capture device. One or more portions of the image capture device may be remote from or a part of the system 10. One or more portions of the system 10 may be remote from or a part of the image capture device. For example, one or more components of the system 10 may be carried by an image capture device, a mobile device, a computing device (e.g., server), and/or other devices. One or more components of the system 10 may be carried by multiple devices.

A mobile device may refer to a piece of portable electronic equipment. A mobile device may refer to a computing device that is small/light enough to hold and/or operate in the hand. Examples of a mobile device include smartphone, a smartwatch, a smart tracker/tag, a tablet, and an image capture device. Other mobile devices are contemplated. A computing device may refer to a piece of electronic equipment controlled by a processor (e.g., CPU). A computing device may refer to large/heavy computing device (e.g., too large/heavy to hold/operate in hand, such as a desktop or a server) and/or small/light computing device (e.g., small/light enough to hold/operate in hand, such as a mobile device).

An image capture device may capture media items including different people and/or things (living things, non-living things). An image capture device may capture media items that include people and/or things not associated with the user of the image capture device. People other than the user of the image capture device may be referred to as non-users. For example, an image capture device may capture an image or a video depicting a non-user and/or a non-user's belonging (e.g., drone, pet). An image capture device may capture a sound clip that includes a non-user's voice. Manually identifying such non-users and/or the non-user's belongings in media items and sharing those portions of the media items with the non-users may be difficult and time consuming.

The present disclosure enables identification of media items for sharing with other people. Transmission and reception of an identifier of a computing device may be used to determine when a non-user and/or a non-user's belonging is near the image capture device. Media item(s) captured by the image capture device when the non-user and/or the non-user's belonging was near the image capture device may be identified and shared with the non-user. Such identification and sharing of media items may enable a person to obtain media items that include the person when the media items were not captured by the person's image capture device.

In some implementations, an image capture device may transmit information about itself (e.g., identifier of the image capture device, time of the image capture device) to a mobile device or another image capture device. In some implementations, a mobile device may transmit information about itself (e.g., identifier of the mobile device, time of the mobile device) to an image capture device.

Figure 3A:
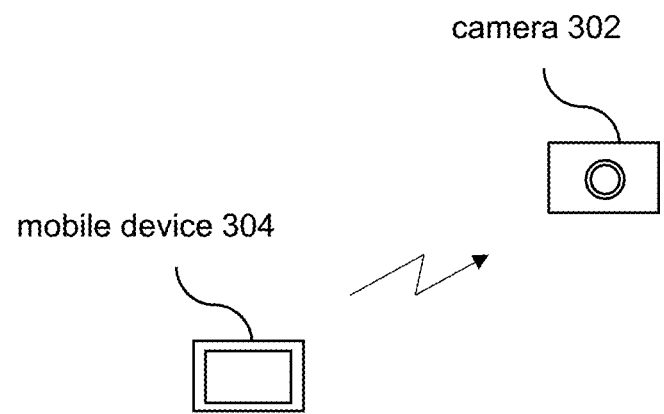
FIG. 3A illustrates an example scenario for identifying media items for sharing.
Figure 3B:
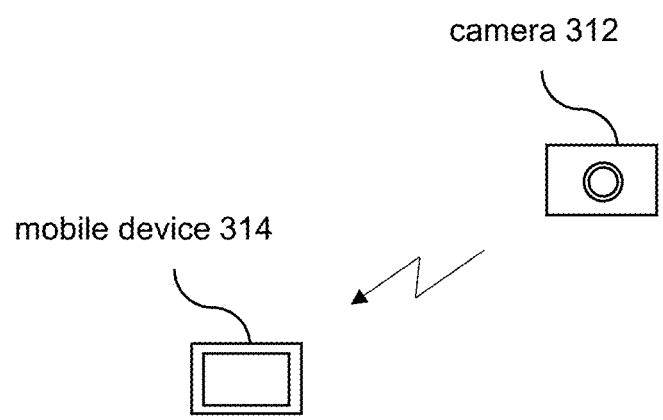
FIG. 3B illustrates an example scenario for identifying media items for sharing.
Figure 3C:
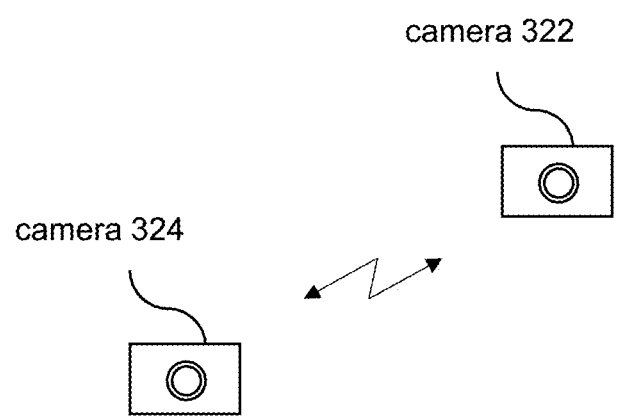
FIG. 3C illustrates an example scenario for identifying media items for sharing.

FIGS. 3A, 3B, and 3C illustrate example scenarios for identifying media items for sharing. Other scenarios are contemplated. Referring to FIG. 3A, a camera 302 may capture media items, such as images, videos, and/or audio clips. A mobile device 304 may come near the camera 302 during media item capture by the camera 302. The mobile device 304 coming near the camera 302 may include the mobile device 304 coming within communication range of the camera 302, or vice versa. The mobile device 304 coming near the camera 302 may include the mobile device 304 being within a threshold distance of the camera 302 so that information wirelessly transmitted by the mobile device 304 is received by the camera 302.

The mobile device 304 may transmit information about the mobile device 304 (e.g., identifier of the mobile device 304, time of the mobile device 304) to the camera 302. The mobile device 304 may continuously/periodically transmit information about the mobile device 304 so that the camera 302 receives the information when the camera 302 is near the mobile device 304. The time when the camera 302 received the information from the mobile device 304 may be used (e.g., by the camera 302, by a computing device such as a desktop or a server) to identify media items that may include the user of the mobile device 304 and/or media items that may be of interest to the user of the mobile device 304. The identifier of the mobile device 304 may be used to identify the user of the mobile device 304. The identified media items (that may include the user of the mobile device 304 and/or may be of interest to the user of the mobile device 304) may be shared with the user of the mobile device 304. For instance, the user of the mobile device 304 may have registered the mobile device 304 along with a contact information for the user, and the contact information for the user may be used to provide the identified media items to the user.

Referring to FIG. 3B, a camera 312 may capture media items. A mobile device 314 may come near the camera 312 during media item capture by the camera 312. The mobile device 314 coming near the camera 312 may include the mobile device 314 coming within communication range of the camera 312, or vice versa. The mobile device 314 coming near the camera 312 may include the mobile device 314 being within a threshold distance of the camera 312 so that information wirelessly transmitted by the camera 312 is received by the mobile device 314.

The camera 312 may transmit information about the camera 312 (e.g., identifier of the camera 312, time of the camera 312) to the mobile device 312. The camera 312 may continuously/periodically transmit information about the camera 312 so that the mobile device 314 receives the information when the mobile device 314 is near the camera 312. The time of the camera 312 received by the mobile device 314 may be used (e.g., by the camera 312, by a computing device such as a desktop or a server) to identify media items that may include the user of the mobile device 314 and/or media items that may be of interest to the user of the mobile device 314. The identifier of the camera 312 may be used to identify the camera 312 on which the media items were captured. The identified media items (that may include the user of the mobile device 314 and/or may be of interest to the user of the mobile device 314) may be shared with the user of the mobile device 314.

Referring to FIG. 3C, a camera 322 and a camera 324 may capture media items. The cameras 322, 324 may come near each other during media item capture by the cameras 322, 324. The cameras 322, 324 coming near each other may include the cameras 322, 324 coming within communication range of the other camera. The cameras 322, 324 coming near each other may include the cameras 322, 324 being within a threshold distance of each other so that information wirelessly transmitted by one camera is received by the other camera.

The cameras 322, 324 may transmit information about itself (e.g., identifier, time) to the other camera. The cameras 322, 324 may continuously/periodically transmit information about itself so that the other camera receives the information when they are near each other (within a certain distance of each other). Information exchanged between the cameras 322, 324 may be used (e.g., by the cameras 322, 324, by a computing device such as a desktop or a server) to identify media items that may include the user of the other camera and/or media items that may be of interest to the user of the other camera.

For example, the time when the camera 322 received the information from the camera 324 may be used to identify media items captured by the camera 322 that may include the user of the camera 324 and/or media items that may be of interest to the user of the camera 324. The identifier of the camera 324 may be used to identify the user of the camera 324. The identified media items (captured by the camera 322) may be shared with the user of the camera 324.

As another example, the time of the camera 324 received by the camera 322 may be used to identify media items captured by the camera 324 that may include the user of the camera 322 and/or media items that may be of interest to the user of the camera 322. The identifier of the camera 322 may be used to identify the user of the camera 322. The identified media items (captured by the camera 324) may be shared with the user of the camera 322.

Such use of transmitted/received information to identify media items captured by an image capture device enables media items captured by the image capture device to be highlighted based on proximity of other computing devices. Such use of transmitted/received information to identify media items captured by an image capture device enables non-users of the image capture device to obtain media items that includes the non-users and/or may be of interest to the non-users. Such use of transmitted/received information to identify media items captured by an image capture device enables media items captured by the image capture device to be automatically tagged/highlighted based on proximity of other computing devices/users to the image capture device.

While FIGS. 3A, 3B, and 3C show interaction between two computing devices (e.g., a camera and a mobile device, two cameras), this is merely as an example and is not meant to be limiting. A computing device may transmit information to other numbers of computing devices. A computing device may receive information from other numbers of computing device.

The processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate identifying media items for sharing. Machine readable instructions 100 may include one or more computer program components. Machine readable instructions 100 may include one or more of a capture component 102, a transmission component 104, a reception component 106, an identification component 108, a provision component 110, and/or other computer program components.

While the computer program components are shown in FIG. 1 as being located within/executed by a single processor 11, this is merely for ease of reference and is not meant to be limiting. The computer program components may be located within/executed by processors of different/multiple computing devices. For example, in a scenario in which a mobile device transmits information (e.g., identifier, time) to an image capture device, the capture component 102 and the reception component 106 may be located within/executed by processor(s) of the image capture device while the transmission component 104 may be located within/executed by processor(s) of the mobile device. In a scenario in which an image capture device transmits information (e.g., identifier, time) to a mobile device, the capture component 102 and the transmission component 104 may be located within/executed by processor(s) of the image capture device while the reception component 106 may be located within/executed by processor(s) of the mobile device. The identification component 108 and the provision component 110 may be located within the image capture device, the mobile device, and/or another computing device, such as a desktop or a server.

The capture component 102 may be configured to capture one or more media items. The media item(s) may include visual content, audio content, and/or other content. For example, the media item(s) may include image(s), video(s), sound clip(s), and/or other media items. The capture component 102 may capture media item(s) using one or more image capture devices. The capture component 102 may capture media items using one or more image sensors, one or more sound sensors, and/or other sensors. The media item(s) may be captured by an image capture device during media item capture. Media item capture may refer to an operation of the image capture device in which the image capture device is capturing one or more media items. Media item capture may include image capture, video capture, sound capture, and/or capture of other media items. The capture component 102 may capture media item(s) at one or more moments in time, over one or more durations of time, and/or at other times.

The transmission component 104 may be configured to transmit, via the transmitter 14, information about a computing device to another computing device. The transmission component 104 may be configured to transmit information about a computing device continuously. The transmission component 104 may be configured to transmit information about a computing device periodically. The transmission component 104 may be configured to transmit information about a computing device at one or more particular moments in time.

In some implementations, a computing device may include a mobile device carried by a user/the user's belongings. The mobile device may include a smartphone, a smartwatch, a smart tracker/tag, a tablet, an image capture device, and/or other mobile device. For example, the transmission component 104 may transmit information about a mobile device (e.g., a smartphone, a smartwatch, a smart tracker/tag, a tablet) to one or more image capture devices. The transmission component 104 may transmit information about an image capture device to one or more mobile devices (e.g., a smartphone, a smartwatch, a smart tracker/tag, a tablet) and/or other image capture device(s). The transmission component 104 may transmit information about a computing device using one or more wireless communication technologies, such as WiFi and/or Bluetooth.

Transmission of information about a computing device occur during media item capture by one or more image capture device(s). The transmission component 104 may transmit information about a computing device while the image capture device(s) are capturing media item(s). For example, the transmission component 104 may transmit information about a mobile device to an image capture device while the image capture device is capturing media item(s). The transmission component 104 may transmit information about an image capture device to a mobile device and/or another image capture device while the image capture device is capturing media item(s).

In some implementations, the transmission component 104 may transmit information about a computing device without awareness of the presence/proximity of other computing devices. The transmission component 104 may transmit information about a computing device regardless of whether another computing device is nearby to receive the information transmitted by the transmission component 104. For example, the transmission of information about the computing device may include broadcast of the information about the computing device, and the other computing device may receive the transmitted information based on being within the range of the broadcast.

In some implementations, the transmission component 104 may transmit information about a computing device based on awareness of the presence/proximity of other computing devices. The transmission component 104 may transmit information about a computing device based on a determination that one or more other computing devices are nearby to receive the information transmitted by the transmission component 104. For example, the transmission of information about the computing device may be performed based on detection of other computing device(s).

Information about a computing device that is transmitted by the transmission component 104 may include an identifier of the computing device, a time of the computing device, and/or other information relating to the computing device. The identifier of the computing device may refer to information (e.g., sequence of characters) that describes, indicates, is specific to, and/or otherwise identifies the computing device and/or a user of the computing device. The transmission of the identifier of the computing device may include transmission of values of the identifier of the computing device. The values of the identifier transmitted by the transmission component 104 may be used to identity the computing device and/or the user of the computing device.

The time of the computing device may refer to time kept/tracked by the computing device. The time of the computing device may refer to system time (e.g., current time and date) that is kept/tracked by the computing device. The transmission of the time of the computing device may include transmission of values that reflect the current time of the computing device. The values that reflect the current time of the computing device may be used to identify when the computing device was near another computing device. The values that reflect the current time of the computing device may be used to identify media items captured near and/or at that by the computing device.

In some implementations, information about a computing device that is transmitted by the transmission component 104 may include information about location and/or motion of the computing device. Information about location of the computing device may include information that identifies where the computing device was located (e.g., at/near the time of information transmission). For example, information about location of the computing device may include GPS location value(s) for the computing device. Information about location of the computing device may be used to determine relative location of the computing device with respect to other computing device(s). Information about motion of the computing may include information that identifies motion of the computing device (e.g., at/near the time of information transmission). For example, information about motion of the computing device may include readings from accelerometer, gyroscope, magnetometer, inertial measurement unit, and/or other motion sensors. Information about motion of the computing device may be used to determine how the computing device/user of the computing device is moving and/or the activity engaged in by the computing device/user of the computing device. Transmission of other types of information about a computing device is contemplated.

The reception component 106 may be configured to receive, via the receiver 15, information about a computing device. The reception component 106 may be configured to receive information about a computing device continuously. The reception component 106 may be configured to receive information about a computing device periodically. The reception component 106 may be configured to receive information about a computing device at one or more particular moments in time.

For example, the reception component 106 may be configured to receive the identifier of the computing device, the time of the computing device, and/or other information relating to the computing device. The reception component 106 may be configured to receive information about location and/or motion of the computing device. In some implementations, a computing device may include a mobile device carried by a user/the user's belonging. The mobile device may include a smartphone, a smartwatch, a smart tracker/tag, a tablet, an image capture device, and/or other mobile device. For example, the reception component 106 may receive, for an image capture device, information about a mobile device (e.g., a smartphone, a smartwatch, a smart tracker/tag, a tablet). The reception component 106 may receive, for a mobile device, information about an image capture device. The reception component 106 may receive information about a computing device using one or more wireless communication technologies, such as WiFi and/or Bluetooth.

Reception of information about a computing device may occur during media item capture by one or more image capture devices. The reception component 106 may receive information about a computing device while the image capture device(s) are capturing media item(s). For example, the reception component 106 may receive, for an image capture device, information about a mobile device while the image capture device is capturing media item(s). The reception component 106 may receive, for a mobile device, information about an image capture device while the image capture device is capturing media item(s).

The reception component 106 may be configured to store information relating to reception of information about a computing device. For example, the reception component 106 may store information received about the computing device (e.g., the identifier of the computing device, the time of the computing device). The reception component 106 may store information on when the information about a computing device was transmitted and/or was received. For example, the reception component 106 may store the current time when the information about a computing device was received (e.g., time of reception). The information about a computing device may include time of transmission (e.g., time stamp to indicate when the information was transmitted) and the reception component 106 may store the time of transmission.

In some implementations, information about the computing device and/or other related information may be stored with media item(s) that are captured by the image capture device(s). Information about the computing device and/or other related information may be stored with media item(s) that are captured when the information is transmitted and/or received. Information about the computing device and/or other related information may be stored as metadata of the media item(s).

For example, an identifier and a time of a mobile device may be transmitted to an image capture device during media item capture by the image capture device. The identifier and the time of the mobile device may be stored by the image capture as metadata of media item(s) captured by the image capture device. For instance, the image capture device may have been capturing an image, a video, and/or a sound clip when the information about the computing device was transmitted and/or received. The image capture device may store the information about the computing device and/or other related information in the metadata track of the image, the video, and/or the sound clip.

In some implementations, information about the computing device and/or other related information may be stored separately from media item(s) that are captured by the image capture device(s). Information about the computing device and/or other information may be stored at a location that does not include the media item(s) captured by the image capture device(s).

For example, an identifier and a time of an image capture device may be transmitted to a mobile device (e.g., carried by a user, carried by the user's belonging) during media item capture by the image capture device. The identifier and the time of the image capture device may be stored by the mobile device separately from the media item(s) captured by the image capture device. For instance, the media item(s) may be stored in an electronic storage of the image capture device while the identifier and the time of the image capture device may be stored in an electronic storage of the mobile device.

In some implementations, the reception component 106 may receive information about a computing device without awareness of the presence/proximity of other computing devices. The reception component 106 may operate to receive information about a computing device regardless of whether another computing device is nearby to transmit the information. For example, the reception component 106 may receive information transmitted by a computing device based on the receiver 15 being within a range of transmission. For example, information about a computing device may be broadcast and the reception component 106 may receive the transmitted information based on being within a range of the broadcast.

In some implementations, the reception component 106 may receive information about a computing device based on awareness of the presence/proximity of other computing devices. The reception component 106 may operate to receive information about a computing device based on a determination that one or more other computing devices are nearby to transmit the information. For example, the reception of information about the computing device may be performed based on detection of other computing device(s).

The identification component 108 may be configured to identify one or more media items captured by an image capture device during media item capture. Identifying a media item may include ascertaining, choosing, discovering, finding, selecting, and/or otherwise identifying the media item. The media item(s) captured by an image capture device during media item capture may be identified for sharing. The media item(s) may be identified for sharing with a particular user. The media item(s) may be identified for provision to a particular user. The media item(s) that are identified may include media items that include the user/belonging of the user (e.g., include depiction the user/belonging of the user, include sound recording of the user/belonging of the user). The media item(s) that are identified may include media items that are of interest to the user.

The media item(s) captured by an image capture device during media item capture may be identified based on the information transmitted/received during the media item capture. For example, the media item(s) captured by the image capture device may be identified based on the identifier of a computing device, the time of a computing device, and/or other information. In some implementations, the media item(s) captured by the image capture device may be identified further based on information about location and/or motion of the computing device. For example, the information about location of the computing device may be used to determine the relative location of the computing device with respect to other computing device(s) and the relative location may be used to identify media items for sharing. As another example, the information about motion of the computing device may be used to determine the activity engaged in by the user of the computing device and the activity engaged in by the user may be used to identify media items for sharing.

Use of information transmitted/received during media item capture to identify media items for sharing may change based on the types of computing device that transmitted/received the information. For example, information transmitted/received and used to identify media items for sharing may depend on whether the information is transmitted by a mobile device (non-image capture mobile device) to an image capture device, whether the information is transmitted by an image capture device to a mobile device (non-image capture mobile device), or whether the information is transmitted by an image capture device to another image capture device.

For example, in a scenario in which a mobile device (non-image capture mobile device) is transmitting information to an image capture device capturing media items, such as shown in FIG. 3A, the time of information transmission by the mobile device and/or the time of information reception by the image capture device may be used to identify one or more media items captured by the image capture device. The media items that were being captured at the time of information transmission by the mobile device and/or the time of information reception by the image capture device may be identified. The media items with start capture time within a threshold duration of the time of information transmission by the mobile device and/or the time of information reception by the image capture device may be identified. The media items with end capture time within a threshold duration of the time of information transmission by the mobile device and/or the time of information reception by the image capture device may be identified. The media items with capture duration that includes the time of information transmission by the mobile device and/or the time of information reception by the image capture device may be identified. Such media items may include the user of the mobile device and/or may be of interest to the user of the mobile device since these media items were captured when the user of the mobile device was near the image capture device.

In a scenario in which an image capture device capturing media items is transmitting information to a mobile device (non-image capture mobile device), such as shown in FIG. 3B, the identifier of the image capture device may be used to identify the image capture device that captured the media items, and the time of the image capture device (e.g., values that reflect the current time of the image capture device when it transmitted information to the mobile) may be used to identify one or more media items captured by the image capture device. The media items that were being captured at the time of the image capture device (that was received by the mobile device) may be identified. The media items with start capture time within a threshold duration of the time of the image capture device may be identified. The media items with end capture time within a threshold duration of the time of the image capture device may be identified. The media items with capture duration that includes the time of the image capture device may be identified. Such media items may include the user of the mobile device and/or may be of interest to the user of the mobile device since these media items were captured when the user of the mobile device was near the image capture device.

In a scenario in which image capture devices are transmitting information to each other, such as shown in FIG. 3C, the time of information transmission by an image capture device, the time of information reception by an image capture device, and/or the time of the image capture device (e.g., values that reflect the current time of the image capture device when it transmitted information to the other image capture device) may be used to identify one or more media items captured by the image capture device. The time when information was transmitted by an image capture device to the other image capture device may be used to identify media items captured by the other image capture device. The time when information transmitted by an image capture device to the other image capture device was received by the other image capture device may be used to identify media items captured by the other image capture device. The time of the image capture device transmitted to the other image capture device may be used to identify media items captured by the image capture device.

Information transmitted by an image capture device may be stored separate from media item(s) captured by the image capture device, and the media items(s) may be identified for sharing based on the information stored separate from the media item(s). For example, an image capture device may transmit its identifier and time to a mobile device. The identifier and the time of the image capture device may be stored by the mobile device separately from the media item(s) captured by the image capture device. The media item(s) may be identified for sharing based on the identifier and the time of the image capture device stored by the mobile device separately from the media item(s).

Information received by an image capture device may be stored with the media item(s) captured by the image capture device. For example, Information received by an image capture device may be stored as metadata of the media item(s) captured by the image capture device. Information may be stored as metadata of the media item(s) captured by the image capture device during and/or within a threshold duration of the information transmission/reception. For instance, a mobile device may transmit its identifier and time to an image capture device. The identifier and time of the mobile device, along with the time of identifier transmission/reception, may be stored by the image capture device as metadata of the media item(s). The media item(s) may be identified for sharing based on the identifier, the time of the mobile device, and the time of information transmission/reception stored by the image capture device as the metadata of the media item(s).

In some implementations, the media item capture by the image capture device may include capture of a video. The media item(s) identified for sharing may include entirety of the video. The media item(s) identified for sharing may include one or more segments of the video. A segment of a video may refer to a temporal part of the video. The timing of capture of the segment of the video may overlap with the timing of information transmission/reception between the image capture device and another computing device. For example, the segment of the video that is identified may have been captured when information was transmitted by a mobile device to an image capture device and/or received by the image capture device from a mobile device. The segment of the video that is identified may have been captured at the time (e.g., current time value) of the image capture device that was transmitted to another computing device.

Figure 4A:
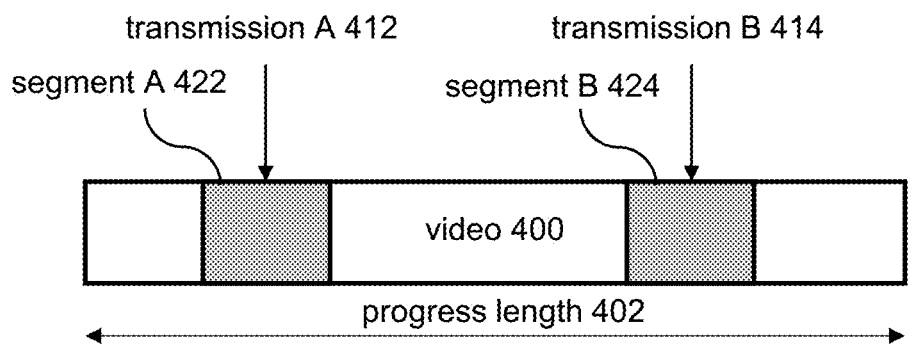
FIG. 4A illustrates an example identification of media items for sharing.

FIG. 4A illustrates an example identification of media items for sharing. A video 400 may have been captured by an image capture device. The video 400 may have a progress length 402 (e.g., duration). Transmission of information between the image capture device and another computing device may have occurred at moments indicated by transmission A 412 and transmission B 414. For example, at transmission A 412, a mobile device may have transmitted its identifier to the image capture device. As another example, at transmission B 414, the image capture device may have transmitted its identifier and time to a mobile device. Based on reception of the identifier of the mobile device through transmission A 412, a segment A 422 may be identified for sharing with the user of the mobile device. Based on reception of the identifier and item of the image capture device through transmission B 414, a segment B 424 may be identified for sharing with the user of the mobile device. These segments may include the user of the mobile device and/or may be of interest to the user of the mobile device since these segments were captured when the mobile device was near the image capture device (e.g., the mobile device was near enough to the image capture device to receive information from the image capture device and/or transmit information to the image capture device).

In some implementations, the media item capture by the image capture device may include capture of a set of images. A set of images may include multiple images. The media item(s) identified for sharing may include entire set of images. The media item(s) identified for sharing may include a subset of images. A subset of images may include less than the entire set of images. The timing of capture of the subset of images may overlap with the timing of information transmission/reception between the image capture device and another computing device. For example, the subset of images that is identified may have been captured when/around the time information was transmitted by a mobile device to an image capture device and/or received by the image capture device from a mobile device. The subset of images that is identified may have been captured at/near the time (e.g., current time value) of the image capture device that was transmitted to another computing device.

Figure 4B:
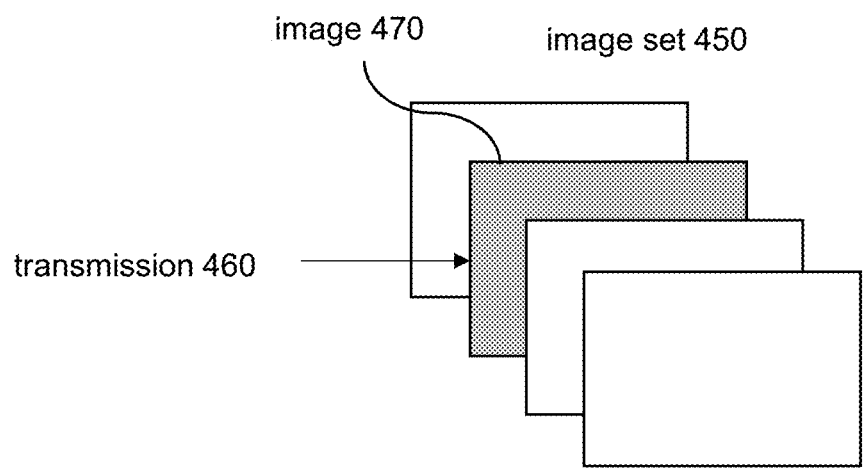
FIG. 4B illustrates an example identification of media items for sharing.

FIG. 4B illustrates an example identification of media items for sharing. An image set 450 including multiple images may have been captured by an image capture device. Transmission of information between the image capture device and another computing device may have occurred at a moment indicated by transmission 460. For example, at transmission 460, a mobile device may have transmitted its identifier to the image capture device and/or the image capture device may have transmitted its identifier and time to the mobile device. Based on information exchanged via the transmission 460, an image 470 may be identified from the image set 450 for sharing. The image 460 may include a depiction of the user and/or may be of interest to the user since the image 460 was captured when the mobile device was near the image capture device.

While FIG. 4A shows the segments 422, 424 as being identified to include the moment of transmissions 412, 414 to be centered within the segments 422, 424, this is merely as an example and is not meant to be limiting. Video segments may be identified such that the moments of transmission are not centered within the video segments. While FIG. 4B shows a single image being identified from a set of images for sharing, this is merely as an example and is not meant to be limiting. Multiple images may be identified from a set of images for sharing. Other identification of media items for sharing is contemplated.

The provision component 110 may be configured to provide the media item(s) to one or more users. Providing a media item to the user may include presenting, sending, transmitting, making available, and/or otherwise providing the media item to the user. For example, the provision component 110 may provide an image/video to a user by uploading the image/video to the user (e.g., to a computing device associated with the user, to a storage account/device associated with the user) and/or by making the image/video available for download by the user. The media item(s) may be provided to the user with or without limits (e.g., limits on where or when the media item(s) may be accessed by the user, limits on number of downloads). The user may view the media item(s), store the media item(s), use the media item(s) to generate media item edits (e.g., a video edit), and/or otherwise use the media item(s).

The provision component 110 may be configured to provide the media item(s) to a user of the computing device that transmitted information (e.g., its identifier, its identifier and time), a user of the computing device that received information of another computing device (e.g., e.g., identifier of another computing, identifier and time of another computing device), and/or other users. For example, referring to FIG. 3A, the provision component 110 may provide media item(s) captured by the camera 302 to a user of the mobile device 304. Referring to FIG. 3B, the provision component 110 may provide media item(s) captured by the camera 312 to a user of the mobile device 314. Referring to FIG. 3C, the provision component 110 may provide media item(s) captured by the camera 322 to a user of the camera 324, and vice versa. The identifier of the mobile device/image capture device may be associated with a user/user contact information, and the associated user/user contacted information may be used to provide the media item(s) to the user.

The users to which the media items are provided may be identified/determined based on association of the users to the computing devices. For instance, users may be associated with different computing devices based registration of the computing devices by the users, and the information provided by the users during the registration may be used to provide the media items to the users. For example, a mobile device may transmit its identifier using Bluetooth (e.g., using a BLE signal) and enable a nearby image capture device to receive and store the mobile device identifier in the metadata of the video being captured. The user of the mobile device may register the mobile device in the cloud with the user's account, creating an association between the mobile device identifier and the user's account. When/after the video is uploaded to the cloud, the mobile device identifier may be found within the metadata of the video. The mobile device identifier may be searched among user-registered devices and the user account associated with the mobile device identifier may be found. The video and/or a portion of the video may be shared with the user account associated with the mobile device identifier. Other association between users and computing devices are contemplated.

For example, referring to FIG. 3C, a user A of the camera 322 may have registered the camera 322 (e.g., via cloud registration) with contact information (e.g., user account name, email address) for the user A, and a user B of the camera 324 may have registered the camera 324 with contact information for the user B. Media items captured by the camera 322 when the camera 324 was nearby (as determined using information transmitted between the cameras 322, 324) may be identified for sharing with the user B of the camera 324. The identified media items (captured by the camera 322) may belong to and/or may exist among media items of the user A. The identified media items may be located among the media items of the user A based on association between the camera 322 and the user A. The user B may be identified as the intended recipient of the identified media items based on association between the camera 324 and the user B. The identified media items may be shared with the user B using the contact information for the user B. Other identification of media items and users of computing devices are contemplated.

In some implementations, a media item captured by an image capture device may be provided to a user of a mobile device based on the user of the image capture device making the media item available for provision to the user of the mobile device. For example, the user of the mobile device may be provided with media item(s) captured by the image capture device if the user of the image capture device has granted permission to share media items captured by the image capture device with other users. The user of the image capture device may be notified that media item(s) captured by the image capture device may include/may be of interest to other user(s) and may be prompted on whether the media item(s) should be shared with other user(s).

In some implementations, a user may be provided with options to customized how their media items may be shared (e.g., limits on media item provision, limits on media item editing by others), licensing under which the media items may be shared (e.g., licensing terms and/or contact information), attribution information for the media items (e.g., names and/or links to be used for attribution), and/or other information relating to sharing of the media items. For example, a user may input to the system 10 information on whether the media items may be shared, sharing limits, licensing, and/or attribution, and the information may be stored in the metadata of the media items.

In some implementations, some or all of the functions of the components 102, 104, 106, 108, 110 of the system 10 may be performed by one or more servers. For example, media items and information on transmission between mobile devices/image capture devices may be stored in a server (e.g., uploaded to the server). The server may utilize information on transmission between mobile devices/image capture devices to automatically identify and/or share media items between different users. Rather than requiring users to manually identify and share their media items with other users, the server may utilize information on transmission between mobile devices/image capture devices to search for media items that include and/or are of interest to a particular user among collection of different users' media items, and provide the identified media items to the particular user.

In some implementations, transmission and/or reception of information by a computing device may be activated/deactivated by a user of the computing device. For example, the computing device may provide one or more options for the user to enable/disable transmission of information by the computing device for reception by other computing device(s). The computing device may provide one or more options for the user to enable/disable reception of information transmitted by other computing device(s). For instance, the computing device may provide option(s) for the user to turn on/off transmission and reception of information disclosed here.

In some implementations, a capture time of a media item may be modified to match the time of a computing device (e.g., a mobile device, another image capture device) stored by the image capture device. For example, a capture time of a media item may be modified to match the time of a computing device stored by the image capture device as the metadata of the media item.

A capture time of a media item may refer to the time (value of time) at which the media item was captured, generated, edited, and/or stored. Times tracked by different computing devices may not match. For example, the time of an image capture device may be faster/slower than the time of a mobile device/another image capture device. Differences in the times of different computing devices may result in shared media items having mismatched capture times. Mismatch in capture times of media items may result in the media items being arranged and/or presented in incorrect order. For example, the time of an image capture device may be an hour faster than the time of a mobile device. The image capture device may capture an image of the user of the mobile device at 2 PM according to the time of the image capture device, and this image may be shared with the user of the mobile device. The image may have the capture time of 2 PM and be presented on the mobile device as an image captured at 2 PM. However, the time of the mobile device when it was near the image capture device was 1 PM, and the image shared from the image capture device may appear out of order (one hour after) to the user of the mobile device.

To avoid shared media items appearing out of order, the capture times of the media items may be modified to match the time of the computing device of the user to which the media items are provided. The capture time of the media items may be adjusted based on the difference between the time of the image capture device that captured the media items and the time of the computing device of the user to which the media items are provided. Adjusting the capture time of the media items to the time of the computing device of the user to which the media items are provided may result in the shared media items appearing in order to the user/on the computing device. Regardless of which (or both) time is incorrect, modifying the capture item of the media items to be shared to match the time of a computing device may make the shared media items having capture time that they would have had if the media items were captured by the computing device (e.g., mobile device, other image capture device).

For example, referring to FIG. 3A, the times of the camera 302 and the mobile device 304 may be different. The mobile device 304 may transmit its time to the camera 302. Before a media item captured by the camera 302 is shared with the user of the mobile device 304, the capture time of the media item may be adjusted to match the time of the mobile device 304. The capture time of the media item may be adjusted based on the difference between the times of the camera 302 and the mobile device 304. The difference between the times of the camera 302 and the mobile device 304 may be determined based on difference between (1) the value of the time of the mobile device 304 transmitted to the camera 302, (2) the value of the time of the camera 302 when it received the transmission from the mobile device 304, and/or other information. Determination of the difference between the times of the camera 302 and the mobile device 304 may take into account time delay caused by transmission and/or reception of information between the camera 302 and the mobile device 304.

Referring to FIG. 3B, the times of the camera 312 and the mobile device 324 may be different. The camera 312 may transmit its time to the mobile device 314. Before a media item captured by the camera 312 is shared with the user of the mobile device 314, the capture time of the media item may be adjusted to match the time of the mobile device 314. The capture time of the media item may be adjusted based on the difference between the times of the camera 312 and the mobile device 314. The difference between the times of the camera 312 and the mobile device 314 may be determined based on difference between (1) the value of the time of the camera 312 transmitted to the mobile device 314, (2) the value of the time of the mobile device 312 when it received the transmission from the camera 312, and/or other information. Determination of the difference between the times of the camera 312 and the mobile device 314 may take into account time delay caused by transmission and/or reception of information between the camera 312 and the mobile device 314.

In some implementations, one or more of the computing devices may be fixed in place. For example, a computing device that transmits information or a computing device that receives information may be fixed at a particular location. Transmission of information between the computing devices may be used to identify media item captured at the particular location. For example, a camera may be fixed at a specific ski jump in a ski resort and may receive information from nearby computing devices, such as a skier's camera/mobile device. The information received from the skier's camera/mobile device may be used to identify media items captured by the fixed camera that may include the skier, and the identified media items may be shared with the skier.

In some implementations, information transmitted by a computing device may be used to identify the location of media items captured near the computing device. For example, a transmitter may be fixed at a specific ski jump in a ski resort and may transmit information to nearby computing device, such as a skier's camera. Media items captured by the camera while in the range of the transmitter may be associated with the information transmitted by the transmitter. For example, the transmitter may transmit its identifier/location, and media items captured by the camera while in range of the transmitter may be associated with the transmitter's identifier/location. For instance, the transmitter's identifier/location may be stored in the metadata of the media items captured by the camera while in the range of the transmitter. Media items captured at/near the transmitter's location may be identified by finding the media items associated with the transmitter's identifier/location.

In some implementations, transmission/reception of information between computing devices disclosed herein may be used to enable transmission of other information between the users of the computing devices. For example, a computing device may transmit an identifier of the user of the computing device, such as a social media handle of the user. Other computing devices may receive the identifier of the user. The identifier of the user may be used to facilitate communication and/interaction between different users. For example, other users/computing devices of other users may use the identifier of the user to track the user (e.g., follow on social media, track the user's location). Other users/computing devices of other users may use the identifier of the user to send message to the user.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11, the electronic storage 13, the transmitter 14, and the receiver 15 are shown to be connected to the interface 12 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of electronic storage 13 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within system 10, or the electronic storage 13 may be provided integrally with one or more other components of system 10 (e.g., processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2A:
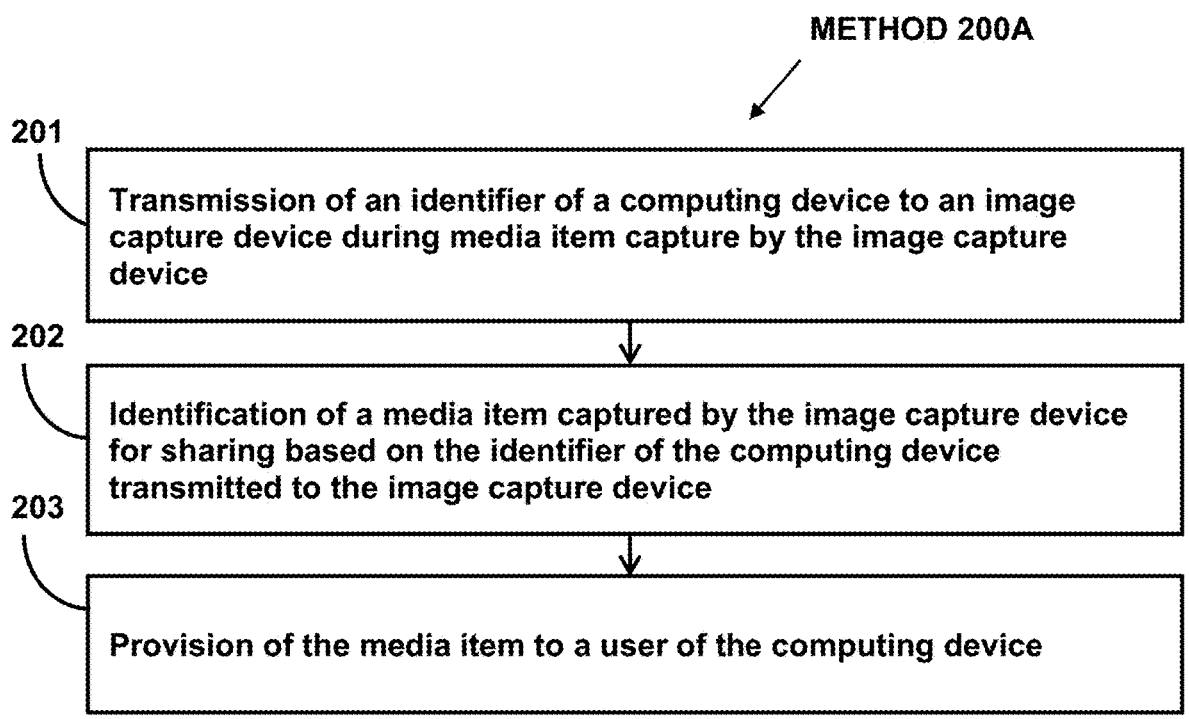
FIG. 2A illustrates a method for identifying media items for sharing.
Figure 2B:
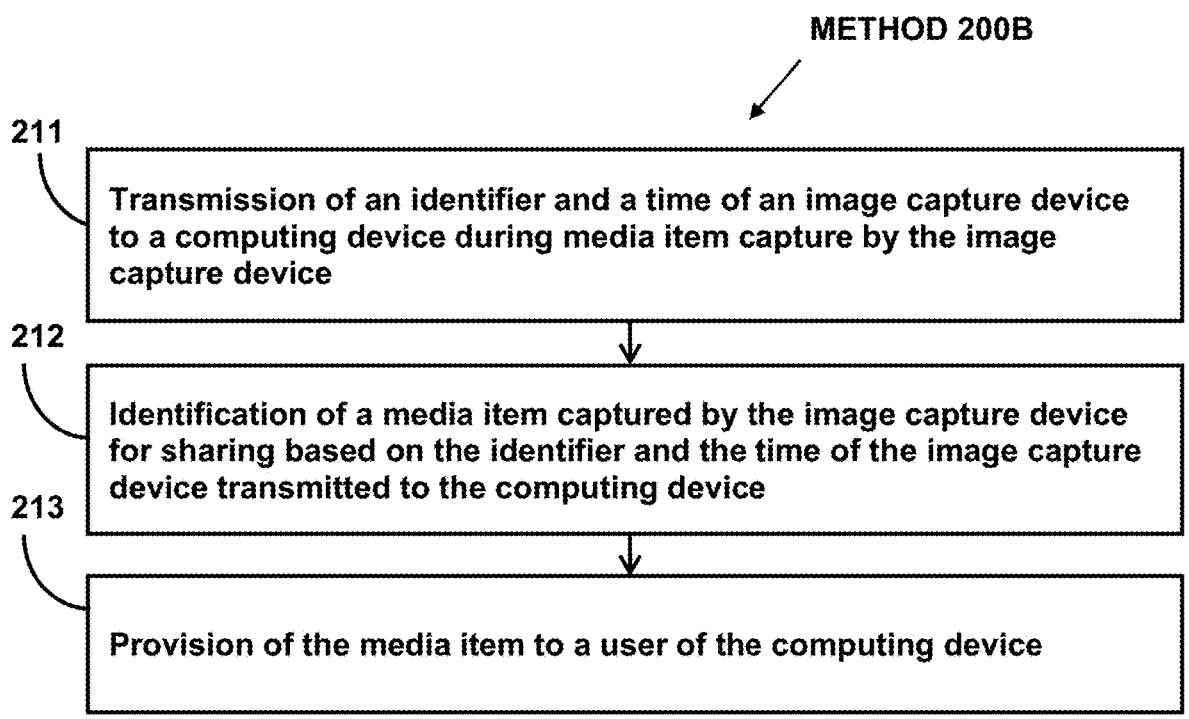
FIG. 2B illustrates a method for identifying media items for sharing.

FIGS. 2A and 2B illustrate methods 200A, 200B for identifying media items for sharing. The operations of methods 200A, 200B presented below are intended to be illustrative. In some implementations, methods 200A, 200B may be accomplished with one or more additional operations not described, and/or without one or more of the operations discussed. In some implementations, two or more of the operations may occur substantially simultaneously.

In some implementations, methods 200A, 200B may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of methods 200A, 200B in response to instructions stored electronically on one or more electronic storage mediums. The one or more processing devices may include one or more devices configured through hardware, firmware, and/or software to be specifically designed for execution of one or more of the operation of methods 200A, 200B.

Referring to FIG. 2A and method 200A, at operation 201, an identifier of a computing device may be transmitted to an image capture device during media item capture by the image capture device. In some implementations, operation 201 may be performed by a processor component the same as or similar to the transmission component 104 (Shown in FIG. 1 and described herein).

At operation 202, a media item captured by the image capture device during the media item capture may be identified for sharing based on the identifier of the computing device transmitted to the image capture device. In some implementations, operation 202 may be performed by a processor component the same as or similar to the identification component 108 (Shown in FIG. 1 and described herein).

At operation 203, the media item may be provided to a user of the computing device. In some implementations, operation 203 may be performed by a processor component the same as or similar to the provision component 110 (Shown in FIG. 1 and described herein).

Referring to FIG. 2B and method 200B, at operation 211, an identifier and a time of an image capture device may be transmitted to a computing device during media item capture by the image capture device. In some implementations, operation 211 may be performed by a processor component the same as or similar to the transmission component 104 (Shown in FIG. 1 and described herein).

At operation 212, a media item captured by the image capture device during the media item capture may be identified for sharing based on the identifier and the time of the image capture device transmitted to the computing device. In some implementations, operation 212 may be performed by a processor component the same as or similar to the identification component 108 (Shown in FIG. 1 and described herein).

At operation 213, the media item may be provided to a user of the computing device. In some implementations, operation 213 may be performed by a processor component the same as or similar to the provision component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for identifying media items for sharing, the system comprising:
    a receiver carried by an image capture device;
    one or more physical processors carried by the image capture device, the one or more physical processors configured by machine-readable instructions to:
        capture a media item; and
        receive, via the receiver, information from a mobile device during the capture of the media item, the information received from the mobile device including an identifier of the mobile device and a value of a system time of the mobile device, wherein the system time of the mobile device is different from a system time of the image capture device, further wherein the identifier of the mobile device and the value of the system time of the mobile device received during the capture of the media item is stored as metadata of the media item;
    wherein:
        the mobile device includes a smartphone, a smartwatch, a smart tracker/tag, a tablet, or another image capture device;
        the media item captured by the image capture device is identified for sharing with a user of the mobile device based on the reception, by the image capture device, of the information from the mobile device during the capture of the media item;
        the user of the mobile device is identified for sharing the media item based on the identifier of the mobile device received by the image capture device during the capture of the media item;
        the difference between the system time of the mobile device and the system time of the image capture device is determined based on the value of the system time of the mobile device received from the mobile device and a value of the system time of the image capture device when the information from the mobile device was received by the image capture device;
        a capture time of the media item identifies a time at which the media item was captured by the image capture device;
        before the provision of the media item to the user of the mobile device, the capture time of the media item is adjusted based on the difference between the system time of the mobile device and the system time of the image capture device to match the capture time the media item would have had if the media item were captured by the mobile device; and
        the media item is provided to the user of the mobile device.

2. The system of claim 1, wherein the media item is identified for sharing with the user of the mobile device further based on the identifier of the mobile device stored as the metadata of the media item.

3. The system of claim 1, wherein the information from the mobile device is received by the image capture device using Bluetooth.

4. The system of claim 1, wherein the media item captured by the image capture device includes a video, and the media item identified for sharing includes a segment of the video, the segment of the video including a temporal part of the video that was captured when the image capture device received the information from the mobile device.

5. The system of claim 1, wherein the media item captured by the image capture device includes a video, and the media item identified for sharing includes entirety of the video.

6. The system of claim 1, wherein:
    the information is broadcast by the mobile device; and
    the image capture device receives the information based on the image capture device being with a range of the broadcast.

7. A method for identifying media items for sharing, the method performed by an image capture device including a receiver and one or more processors, the method comprising:
    capturing a media item; and
    receiving, via the receiver, information from a mobile device during the capture of the media item, the information received from the mobile device including an identifier of the mobile device and a value of a system time of the mobile device, wherein the system time of the mobile device is different from a system time of the image capture device, further wherein the identifier of the mobile device and the value of the system time of the mobile device received during the capture of the media item is stored as metadata of the media item;
    wherein:
        the mobile device includes a smartphone, a smartwatch, a smart tracker/tag, a tablet, or another image capture device;
        the media item captured by the image capture device is identified for sharing with a user of the mobile device based on the reception, by the image capture device, of the information from the mobile device during the capture of the media item;
        the user of the mobile device is identified for sharing the media item based on the identifier of the mobile device received by the image capture device during the capture of the media item;

the difference between the system time of the mobile device and the system time of the image capture device is determined based on the value of the system time of the mobile device received from the mobile device and a value of the system time of the image capture device when the information from the mobile device was received by the image capture device;

a capture time of the media item identifies a time at which the media item was captured by the image capture device;

before the provision of the media item to the user of the mobile device, the capture time of the media item is adjusted based on the difference between the system time of the mobile device and the system time of the image capture device to match the capture time the media item would have had if the media item were captured by the mobile device; and the media item is provided to the user of the mobile device.

8. The method of claim 7, wherein the media item is identified for sharing with the user of the mobile device further based on the identifier of the mobile device stored as the metadata of the media item.

9. The method of claim 7, wherein the information from the mobile device is received by the image capture device using Bluetooth.

10. The method of claim 7, wherein the media item captured by the image capture device includes a video, and the media item identified for sharing includes a segment of the video, the segment of the video including a temporal part of the video that was captured when the image capture device received the information from the mobile device.

11. The method of claim 7, wherein the media item captured by the image capture device includes a video, and the media item identified for sharing includes entirety of the video.

12. The method of claim 7, wherein:
the information is broadcast by the mobile device; and
the image capture device receives the information based on the image capture device being with a range of the broadcast.

* * * * *